United States Patent
Ng et al.

(10) Patent No.: US 10,362,301 B2
(45) Date of Patent: Jul. 23, 2019

(54) DESIGNING CONTENT FOR MULTI-VIEW DISPLAY

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 230 days.

(21) Appl. No.: 15/062,103

(22) Filed: Mar. 5, 2016

(65) Prior Publication Data

US 2016/0261856 A1 Sep. 8, 2016

Related U.S. Application Data

(60) Provisional application No. 62/128,968, filed on Mar. 5, 2015.

(51) Int. Cl.
*H04N 13/366* (2018.01)
*H04N 13/398* (2018.01)
*H04N 13/351* (2018.01)
*H04N 13/30* (2018.01)

(52) U.S. Cl.
CPC ......... *H04N 13/366* (2018.05); *H04N 13/351* (2018.05); *H04N 13/398* (2018.05); *H04N 2013/403* (2018.05)

(58) Field of Classification Search
CPC ........... H04N 13/0468; H04N 13/0447; H04N 13/0497

USPC .......................................................... 348/59
See application file for complete search history.

(56) References Cited

U.S. PATENT DOCUMENTS

| | | | |
|---|---|---|---|
| 5,855,425 A | 1/1999 | Hamagishi |
| 6,339,421 B1 | 1/2002 | Puckeridge |
| 6,377,295 B1 | 4/2002 | Woodgate et al. |
| 7,001,023 B2 | 2/2006 | Lee et al. |
| 7,602,395 B1 | 10/2009 | Diard |
| 7,990,498 B2 | 8/2011 | Hong |
| 8,461,995 B1 | 6/2013 | Thornton |
| 9,080,219 B2 | 7/2015 | Chang et al. |
| 9,080,279 B2 | 7/2015 | Jun et al. |

(Continued)

FOREIGN PATENT DOCUMENTS

| | | |
|---|---|---|
| EP | 2685735 A1 | 1/2014 |
| WO | 0224470 A | 3/2002 |
| WO | 2013183108 A1 | 12/2013 |

OTHER PUBLICATIONS

"Notice of Allowance and Fees Due", U.S. Appl. No. 15/180,341, dated Jul. 11, 2017, 7 pp.

(Continued)

*Primary Examiner* — Nguyen T Truong
(74) *Attorney, Agent, or Firm* — Kaplan Breyer Schwarz, LLP

(57) ABSTRACT

The specification and drawings present a signage design device (SDD) and a method for using such a device for designing content for a multi-view display (MVD) intended for simultaneously displaying multiple versions of content to multiple corresponding viewing zones. The multi-view display may be a static multi-view signage print (SMVSP) or an electronic multi-view display (EMVD), as described herein.

23 Claims, 10 Drawing Sheets

(56) References Cited

U.S. PATENT DOCUMENTS

| | | | |
|---|---|---|---|
| 9,715,827 B2 | 7/2017 | Ng et al. | |
| 9,743,500 B2 | 8/2017 | Dietz et al. | |
| 9,792,712 B2 | 10/2017 | Ng et al. | |
| 2003/0115096 A1 | 6/2003 | Reynolds et al. | |
| 2003/0156260 A1 | 8/2003 | Putilin et al. | |
| 2005/0195330 A1 | 9/2005 | Zacks et al. | |
| 2007/0040892 A1 | 2/2007 | Aoki et al. | |
| 2009/0273486 A1 | 11/2009 | Sitbon | |
| 2010/0085517 A1 | 4/2010 | Hong | |
| 2010/0207961 A1 | 8/2010 | Zomet | |
| 2010/0214537 A1 | 8/2010 | Thomas | |
| 2011/0159929 A1* | 6/2011 | Karaoguz | H04N 21/4312 455/566 |
| 2011/0216171 A1 | 9/2011 | Barre et al. | |
| 2011/0242298 A1 | 10/2011 | Bathiche et al. | |
| 2011/0304613 A1 | 12/2011 | Thoresson | |
| 2012/0026157 A1 | 2/2012 | Unkel et al. | |
| 2012/0062565 A1 | 3/2012 | Fuchs et al. | |
| 2012/0105445 A1 | 5/2012 | Sakai et al. | |
| 2012/0140048 A1 | 6/2012 | Levine | |
| 2012/0218253 A1 | 8/2012 | Clavin | |
| 2013/0093752 A1 | 4/2013 | Yuan | |
| 2013/0114019 A1 | 5/2013 | Ijzerman et al. | |
| 2013/0169765 A1 | 7/2013 | Park et al. | |
| 2013/0321599 A1 | 12/2013 | Harrold et al. | |
| 2014/0015829 A1 | 1/2014 | Park et al. | |
| 2014/0035877 A1 | 2/2014 | Cai et al. | |
| 2014/0111101 A1 | 4/2014 | McRae | |
| 2015/0020135 A1 | 1/2015 | Frusina et al. | |
| 2015/0042771 A1 | 2/2015 | Jensen et al. | |
| 2015/0049176 A1 | 2/2015 | Hinnen et al. | |
| 2015/0062314 A1 | 3/2015 | Itoh | |
| 2015/0085091 A1 | 3/2015 | Varekamp | |
| 2015/0092026 A1 | 4/2015 | Baik et al. | |
| 2015/0154394 A1 | 6/2015 | Kapinos et al. | |
| 2015/0198940 A1 | 7/2015 | Hwang et al. | |
| 2015/0279321 A1 | 10/2015 | Falconer et al. | |
| 2015/0334807 A1 | 11/2015 | Gordin et al. | |
| 2015/0365422 A1 | 12/2015 | Peterson et al. | |
| 2016/0012726 A1 | 1/2016 | Wang | |
| 2016/0210100 A1 | 7/2016 | Ng et al. | |
| 2016/0212417 A1 | 7/2016 | Ng et al. | |
| 2016/0224122 A1 | 8/2016 | Dietz et al. | |
| 2016/0227200 A1 | 8/2016 | Reitterer et al. | |
| 2016/0227201 A1 | 8/2016 | Ng et al. | |
| 2016/0261837 A1 | 9/2016 | Thompson et al. | |
| 2016/0261856 A1 | 9/2016 | Ng et al. | |
| 2016/0293003 A1 | 10/2016 | Ng et al. | |
| 2016/0341375 A1 | 11/2016 | Baker | |
| 2016/0341377 A1 | 11/2016 | Eddins | |
| 2016/0366749 A1 | 12/2016 | Dietz et al. | |
| 2016/0371866 A1 | 12/2016 | Ng et al. | |
| 2017/0205889 A1 | 7/2017 | Ng et al. | |

OTHER PUBLICATIONS

"Notice of Allowance", Issued in U.S. Appl. No. 15/184,874, dated Sep. 8, 2017, 14 pp.
"Final Office Action", U.S. Appl. No. 15/002,164, dated Oct. 5, 2017, 27 pp.
"Final Office Action", U.S. Appl. No. 15/002,175, dated Nov. 2, 2017, 21 pp.
"Non-Final Office Action", U.S. Appl. No. 15/002,014, dated Oct. 27, 2017, 11 pp.
"Final Office Action", U.S. Appl. No. 15/015,099, dated Nov. 13, 2017, 14 pp.
"Non-Final Office Action", U.S. Appl. No. 15/002,158, dated Mar. 3, 2017, pp. 19.
Authorized Officer: Jacinta Molloy, "International Search Report and Written Opinion" dated Sep. 29, 2016 in PCT Application No. PCT/US2016/037185.
"Office Action" dated Oct. 6, 2016 in U.S. Appl. No. 15/060,527.
Authorized Officer: Mehrdad Dastouri, "International Preliminary Report on Patentability" dated Feb. 3, 2017 issued in PCT International Application PCT/US16/14122, 21 pp.
"Non-Final Office Action", dated Mar. 22, 2017, Issued in related U.S. Appl. No. 15/002,164, 28 pp.
Officer: Jeffrey Harold, "International Preliminary Report on Patentability", Completed Mar. 20, 2017, Issued in International Patent Application PCT/US2016/020784, 6 pp.
Officer: Patricia Stein, "International Search Report and Written Opinion", dated Jun. 3, 2016, issued in related PCT Application: PCT/US2016/04122.
"Non-Final Office Action" dated Jan. 31, 2017, Issued in U.S. Appl. No. 15/180,341.
"Non Final Office Action" dated Apr. 4, 2018 in U.S. Appl. No. 15/002,158, pp. 23.
"Non-Final Office Action" dated Feb. 8, 2018 in U.S. Appl. No. 15/060,527.
Officer: Patricia Stein, "International Search Report and Written Opinion", dated May 12, 2016, issued in related PCT Application: PCT/US2016/020784.
"Non-Final Office Action", U.S. Appl. No. 15/060,527, dated May 19, 2017, 13 pp.
"Non-Final Office Action", Related U.S. Appl. No. 15/184,874, dated May 22, 2017, 19 pp.
"Non-Final Office Action", Related U.S. Appl. No. 15/015,099, dated May 4, 2017, 9 pp.
"Non-Final Office Action", dated Mar. 24, 2017, Issued in related U.S. Appl. No. 15/002,175, 26 pp.
"Non-Final Office Action", dated Jan. 26, 2017, issued in U.S. Appl. No. 15/088,912.
"Advisory Action" received for U.S. Appl. No. 15/002,175, dated Jun. 21, 2018, 3 pages.
Office Action received for European Application No. 16707570.4, dated Sep. 13, 2018, 6 pages.
Non-Final Office Action received for U.S. Appl. No. 15/015,099 dated Oct. 12, 2018, 6 pages.
Final Office Action received for U.S. Appl. No. 15/060,527 dated Oct. 5, 2018, 14 pages.
Final Office Action received for U.S. Appl. No. 15/002,158 dated Oct. 5, 2018, 22 pages.
Notice of Allowance and Fees Due (PTOL-85) received for U.S. Appl. No. 15/060,527, dated Mar. 14, 2019, 8 pages.
Notice of Allowance and Fees Due (PTOL-85) received for U.S. Appl. No. 15/015,099, dated Dec. 18, 2018, 5 pages.
Non-Final Rejection received for U.S. Appl. No. 15/002,014, dated Jan. 15, 2019, 18 pages.
Final Rejection received for U.S. Appl. No. 15/944,366, dated Nov. 14, 2018, 26 pages.
Examiner initiated interview summary (PTO-413B) received for U.S. Appl. No. 15/060,527, dated Jan. 30, 2019, 2 pages.
Advisory Action (PTOL-303) received for U.S. Appl. No. 15/944,366, dated Feb. 20, 2019, 3 pages.
Advisory Action (PTOL-303) received for U.S. Appl. No. 15/060,527 , dated Jan. 30, 2019, 3 pages.
Advisory Action (PTOL-303) received for U.S. Appl. No. 15/002,158, dated Dec. 20, 2018, 4 pages.

* cited by examiner

DESIGNING CONTENT FOR MULTI-VIEW DISPLAY

CROSS REFERENCE TO RELATED APPLICATIONS

This case claims priority and the benefit of the filing date under 35 USC 120 of U.S. provisional patent application Ser. No. 62/128,968 filed Mar. 5, 2015, the teaching of which is incorporated herein by reference in its entirety. This case is also related to the U.S. non-provisional patent application Ser. No. 15/002,014 filed Jan. 20, 2016, Ser. No. 15/002,158 filed on Jan. 20, 2016, Ser. No. 15/002,164 filed on Jan. 20, 2016, Ser. No. 15/002,175 filed on Jan. 20, 2016 Ser. No. 15/015,099 filed on Feb. 3, 2016, and Ser. No. 15/060,527 filed on Mar. 3, 2016, the teachings of all of which are incorporated herein by reference in their entirety. To the extent there are any inconsistencies between the language used in this disclosure and the language used in the provisional patent application Ser. No. 62/128,968 or in the non-provisional cases listed above, the language used in this disclosure controls.

FIELD OF THE INVENTION

The present invention relates to static and electronic displays, and, more particularly, to design content of multi-view displays such as static multi-view signage prints and electronic multi-view displays intended for simultaneously displaying multiple distinct images (for different viewing locations).

BACKGROUND OF THE INVENTION

Standard signage, including billboards, posters, banners, murals, labels, and other signs, typically provide the same content to all viewers, independent of viewing location. This often limits the purpose of the signage to general information broadcast, or to deliver relevant content to some location(s) at the expense of less relevance to others. For example, an advertisement poster in a grocery store placed in front of the vegetables display may show a discount on vegetables. While relevant for shoppers standing by the vegetables, the poster may be irrelevant to shoppers standing by other products, such as the dairy section.

Lenticular signage can be used to display different content to different locations. One common application of this is for auto-stereoscopic 3D. By directing different views of the same scene at high angular resolution, the two eyes of a viewer may each see an appropriate image to create a 3D effect.

Lenticular signage can also be used as multi-view signage in static multi-view displays (SMVD), presenting different content to different locations. For example, this could be used to create an animated effect for moving viewers, or to provide additional content that can be accessed by changing viewing location. Such signage, if designed correctly, may present different content to different locations in the environment to improve relevancy. In the aforementioned grocery store example, a static multi-view sign may direct a vegetable-promotion image towards the vegetable display, while simultaneously directing a dairy promotion towards the dairy section. However, the process for designing such static multi-view signage is cumbersome and needs further improvements.

In more recent developments, an electronic multi-view display (EMVD) can simultaneously present a different respective image to each one of plural viewers that are at different viewing locations with respect to the EMVD. For example, Sharp Corporation and Microsoft Corporation have developed displays that are capable of showing a small number of independent views based on the viewer's angle with respect to the display. Viewers can interact with these displays using standard control devices. For example, there might be separate game controllers for a left view and a right view.

Advances in technology are expected to result in next-generation EMVDs that would enable hundreds to thousands of people to simultaneously view a single display yet each see something different. These devices would be able to operate by controlling the images presented at different viewing locations, each of which has a unique viewing angle with respect to the EMVD. Further advances in designing content for such displays are desired.

SUMMARY OF THE INVENTION

Various embodiments of the invention disclose a signage design device (SDD) and a corresponding method to assist in designing content for a multi-view display (MVD) intended for simultaneously displaying multiple different respective images to viewers in different viewing locations and zones, defined relative to the MVD. The multi-view display may be a static multi-view signage print (SMVSP) broadly defined herein, or an electronic multi-view display (EMVD).

The SDD can enable users/designers to more efficiently design content for the multi-view displays. In some embodiments, a signage design device comprises a camera (or, more generally, a position-determining device), a computer, a display, and/or an input mechanism/device. For static displays, a predefined visual marker is placed in the desired location of the MVD in the illustrative embodiment. For electronic displays, in the illustrative embodiment, a visual graphic is displayed on the multi-view display itself. In both cases, this situates the SDD, being in a particular viewing location and optionally using the MVD system, to determine a position of the SDD relative to the visual marker or visual graphic, or, more generally, relative to the MVD.

After determining the position of the SDD in the viewing location, the SDD uses content selected by the user/designer (e.g., received through the input device) to display, on the display of the SDD a simulated image of that content. The simulated image is an image of the selected content to be viewed from the viewing location on the multi-view display. This approach provides feedback to the user/designer for updating the content. In some embodiments, for the electronic multi-view displays, the image with the selected content for the determined position of the viewing location is displayed, using the SDD, directly on the EMVD. Moreover, the user/designer can move the SDD to have different contents being pre-visualized, providing further feedback on the content design/reselection for the MVDs.

According to another embodiment described herein, the SDD is relocated sequentially to a plurality of locations, so that the SDD identifies zones relative to an area allocated for the multi-view display. Each viewing zone can be defined by one or more locations of the plurality of locations.

In summary, in accordance with an embodiment, a method for designing content for a multi-view display comprises:

when a signage design device is placed at one viewing location, determining for the one viewing location, using the signage design device, a position relative to the multi-view display; and receiving, through an input device of the signage design device, a content selection to be displayed on the multi-view display for viewing from the one viewing location.

In accordance with another embodiment, a method for designing content for a multi-view display comprises:

when a signage design device is placed at one viewing location, determining for the one viewing location, using the signage design device, a position relative to the multi-view display;

receiving, through an input device of the signage design device, a content selection to be displayed on the multi-view display for viewing from the one viewing location; and displaying, using the signage design device, a simulated image of a selected content using the determined relative position of the one viewing location, the simulated image being an image of the selected content to be viewed from the one viewing location on the multi-view display.

In accordance with yet a further embodiment, a signage design device, for designing content for a multi-view display, comprises:

a position determining device, configured to facilitate determining a position of the signage design device placed at one viewing location, the position being determined relative to an area allocated for the multi-view display;

an input device, configured to receive a content selection for the multi-view display to be viewed from the one viewing location; and a computer, configured to:
  (i) provide instructions to the position determining device; and
  (ii) receive information generated using the position determining device for determining the position.

In accordance with an additional embodiment, a signage design device, for designing content for a multi-view display, comprises:

a position determining device, configured to facilitate determining a position of the signage design device placed at one viewing location, the position being determined relative to an area allocated for the multi-view display;

an input device, configured to receive a content selection for the multi-view display to be viewed from the one viewing location; and a computer, configured to:
  (i) provide instructions to the position determining device;
  (ii) receive information generated using the position determining device for determining the position; and
  (iii) display a simulated image of a selected content using the determined relative position of the one viewing location, the simulated image being an image of the selected content to be viewed from the one viewing location on the multi-view display.

According to a further embodiment, a method in accordance with the present teachings comprises:

when a signage design device is relocated sequentially to a plurality of locations;

facilitating, by the signage design device, determination of one or more viewing zones relative to an area allocated for the multi-view display, each viewing zone being defined by one or more locations of the plurality of locations, for designing, based at least on the determined viewing zones, corresponding images with different contents to be displayed on the multi-view display, each of the images being only visible from one viewing zone of the determined viewing zones.

In a further embodiment based on the method disclosed in this paragraph, at least one viewing zone is defined by multiple locations.

It is noted that this summary provides a selection of simplified concepts that are further described in the detailed description and accompanying drawings. It does not exhaustively list the features of the invention, nor is it intended to restrict the scope of the claimed subject matter.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

DETAILED DESCRIPTION

Figure 1:
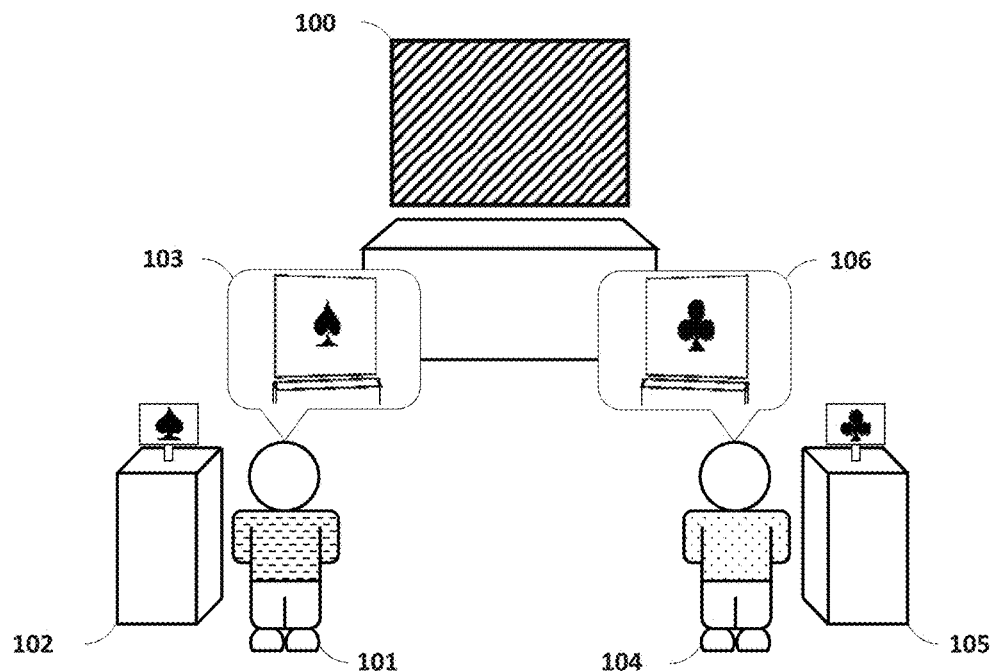
FIG. 1 is a diagram depicting a static multi-view sign presenting different content to different locations.

The terms appearing below and inflected forms thereof are defined for use in this disclosure and the appended claims as follows:

"Content" means whatever is delivered to a viewer via the MVD, including, without limitation, light, color, and complex media. In some contexts, the absence of light, color, or media can be considered content, as examples.

"Electronic multi-view display" or "EMVD" means a type of the MVD (described herein) that is capable of simultaneously presenting different respective images to different viewers that are at different viewing angles and/or distances with respect to the EMVD. The images presented on the electronic display may be dynamically changed by corresponding software to display different contents.

"Multi-view display" or "MVD" means a display that is capable of simultaneously presenting different respective images to different viewers that are at different viewing angles (locations) and/or distances with respect to the MVD. The different respective images seen by different viewers are displayed in the same location of the display, i.e. being overlapping. The MVD, for the purposes of this disclosure, can be a static multi-view signage print (SMVSP) such as a lenticular print or an electronic multi-view display (EMVD), as described herein.

"Signage design device" or "SDD" means a device for assisting design of content for multi-view displays including static multi-view signage prints and electronic multi-view displays as described herein.

"Static multi-view signage print" or "SMVSP" means a type of MVD which can be made using various methods such as lenticular signs, dot or fly-eye lenticulars, as well as hologram and parallax barrier techniques and the like, to simultaneously present interlacing/overlapping images with different content viewed by different users in different viewing locations and/or zones at different viewing angles with respect to the SMVSP.

"Viewing location" means a specific location from which a single viewer may observe the multi-view display.

"Viewing zone" means a region in which a viewer can view one content image presented by the MVD. It is a defined area in which the multi-view display provides a common experience. There can be many locations within a viewing zone. Zones also need not be contiguous.

As stated herein, the process for designing multi-view displays has, until now, been cumbersome. Without a way to pre-visualize the content on the display, it can be difficult for a designer to correlate the content with the environmental context. Thus, a more efficient and intuitive system to design content for multi-view displays is desired.

A signage design device (SDD) and method for its use, as disclosed herein, facilitate the design of content for a multi-view display (MVD) intended for simultaneously displaying multiple different respective images to viewers in different viewing locations and zones, defined relative to the MVD. The multi-view display described herein may be a static multi-view signage print (SMVDP) or an electronic multi-view display (EMVD), as described herein.

In this document, the terms "direction" and "angle" may refer to a particular angle, a consecutive range of angles, an angular zone, or a combination of angles and distances. The viewing direction and/or angle may be designated in a single dimension, for example the horizontal dimension, or for multiple dimensions, such as the horizontal and vertical dimensions. Furthermore, the term "position" may refer to an appropriate angle and/or a distance.

It is notable that the effective use of MVDs is largely contingent on the ability to correlate the display and its content with the viewing environment. With this in mind, a tool is needed to assist in tasks such as:
 the selection and design of each version of the content to be shown on the display;
 the layout of viewing zones for each version of the content;
 the placement, angle, and sizing of the multi-view display;
 the selection and specifications of multi-view technology for each situation; and
 adjustments to the surrounding environment itself.

The tool will also assist in the sale, rental, approval, coordination, and demonstration of MVDs and their content for purchasers, lessees, content sponsors, content providers, content designers, advertisers, interior designers, lighting designers, architects, and a range of other users and stakeholders. Among the features that might be desired in such a tool, among any others, is the ability to: (i) identify different viewing zones and (ii) pre-visualize, or visualize in real-time the proposed content for the display as seen within the context of the surrounding environment and sightlines. All of the above are by way of example and not to be construed as limiting the scope of application.

Consider the case of static multi-view signage print (SMVSP), an example of which is lenticular prints, which can display different content to viewers at different locations relative to the multi-view display. This ability can be used to provide different images tailored for different contexts. For example, as in FIG. 1, a lenticular sign 100 in a store may present different content to different product displays. A shopper 101 standing by the first product display 102 may see information 103 related to the first product, while another shopper 104 standing by the second product display 105 may simultaneously see information 106 related to the second product.

Figure 2:
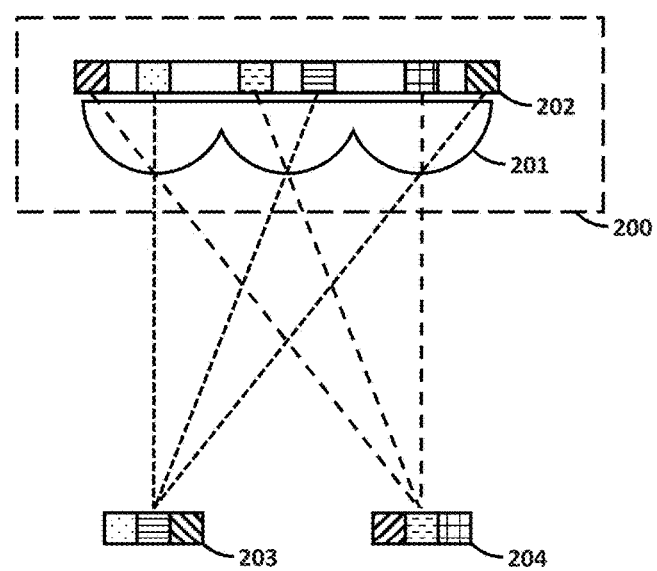
FIG. 2 is a diagram depicting lenses on a lenticular print magnifying different portions of the print pattern from different viewing angles.

Lenticular prints may comprise a plurality of lenses in front of a print pattern. FIG. 2 shows an exemplary lenticular print 200 with three lenses 201 in front of a print pattern 202. Each lens, when viewed from a particular viewing angle, may magnify a particular area of the pattern underneath the lens. Different viewing angles may correspond to different pattern areas, resulting in the lens having a different appearance from different viewing angles 203 and 204.

The pattern may be printed directly on the back of the lenticular lenses, or it may be printed on a separate medium adhered, laminated, and/or otherwise placed behind the lenses. The lenses may take a variety of forms, including, but not limited to, cylindrical lenticulars, dot or fly-eye lenticulars, and/or any combination thereof.

Figure 3:
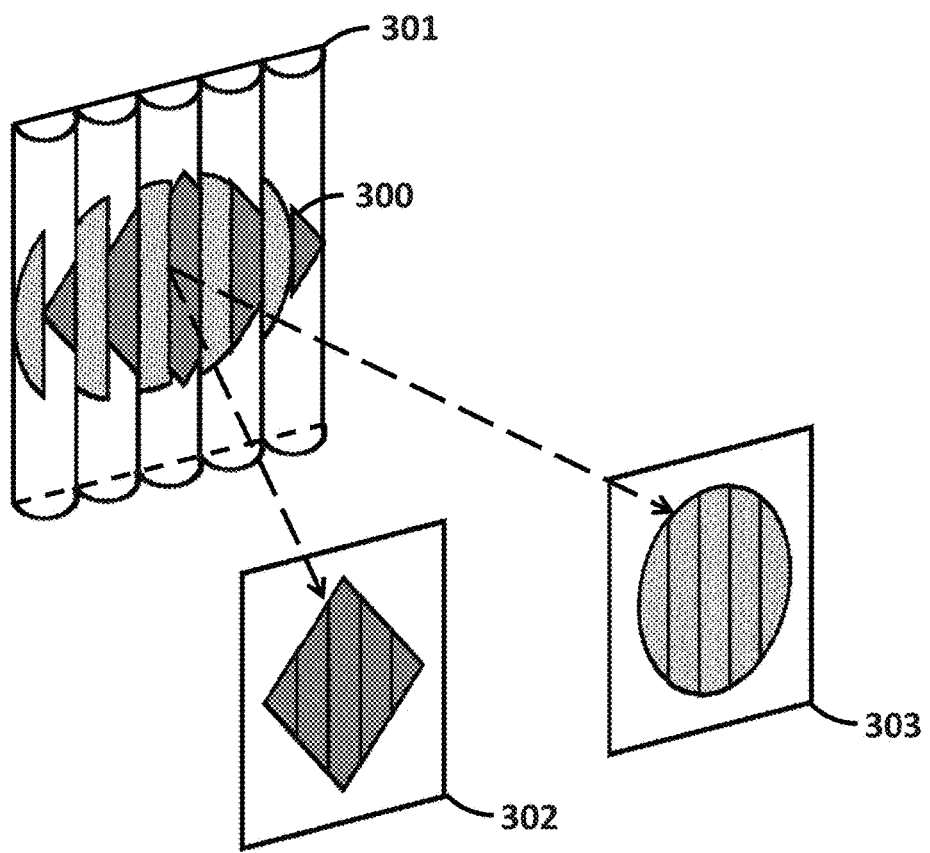
FIG. 3 is a diagram depicting an example of a multi-view lenticular sign with an interlaced pattern, directing different images in two different directions.

Designing the print pattern in a lenticular print typically comprises multiple steps. For a given viewing location relative to the print, the viewing angle for each lens may be determined. The pattern underneath each lens corresponding to the viewing angle may be designed to be the portion of the image to be viewed from that viewing location corresponding to that lens. This often results in an interlacing of the images to be presented at different viewing angles. FIG. 3 shows an exemplary interlaced pattern 300 for a two-view lenticular print. With a cylindrical lens array 301, the two images that may be seen are 302 and 303.

For a lenticular print with a plurality of lenses, a viewing location may be associated with different angles for each lens. For a large lenticular print relative to the viewing distance, the angles for each lens may differ significantly. By estimating both the angle and distance to the sign from a viewing location, the angles for each lens may be estimated.

It is noted that the above description is not meant to be an exhaustive list of possible implementations of SMVSPs, and alternative implementations do not fall outside of the spirit of the invention or restrict the scope of the subject matter.

According to embodiments described herein, a designer may more easily visualize the content of the sign in the context of the environment without having to manufacture the sign. This pre-visualization ability may allow designers to more efficiently iterate on the design.

Figure 4:
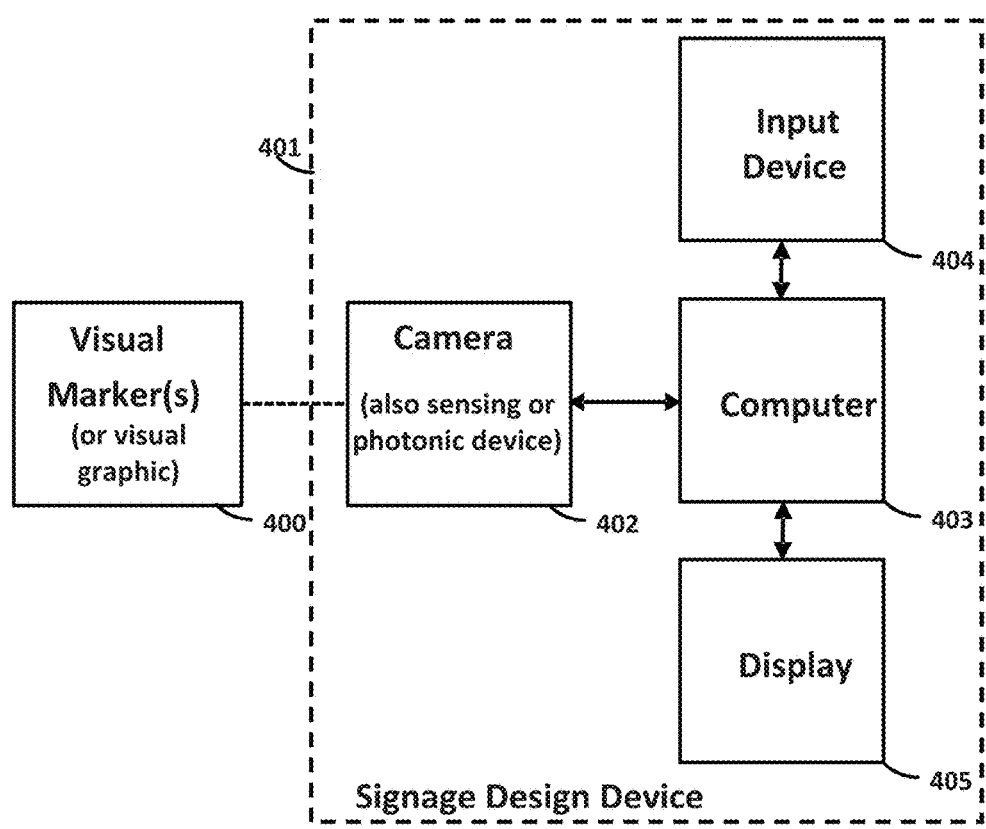
FIG. 4 is a block diagram of an exemplary system that enables users to more efficiently design static multi-view signage, according to an embodiment of the invention.

According to one embodiment of the invention, the disclosed technology may utilize a signage design device to allow a static multi-view sign designer to more efficiently design signs for the SMVSPs. FIG. 4 depicts an exemplary block diagram of the system, which may comprise one or more visual markers 400 and a signage design device (SDD) 401. The signage design device 401 may comprise a camera 402, a computer 403, an input device 404, and/or a display 405. Examples of signage design devices may include, but are not limited to, smartphones, tablets, laptops, smart glasses, and/or custom devices. Examples of input devices may include, but are not limited to, touchscreens, keyboards, mice, and/or gesture interfaces. The visual markers can be encoded using, for example QR (Quick Response) code or the like. It is well known to those skilled in the art how to design appropriate visual markers.

Figure 5:
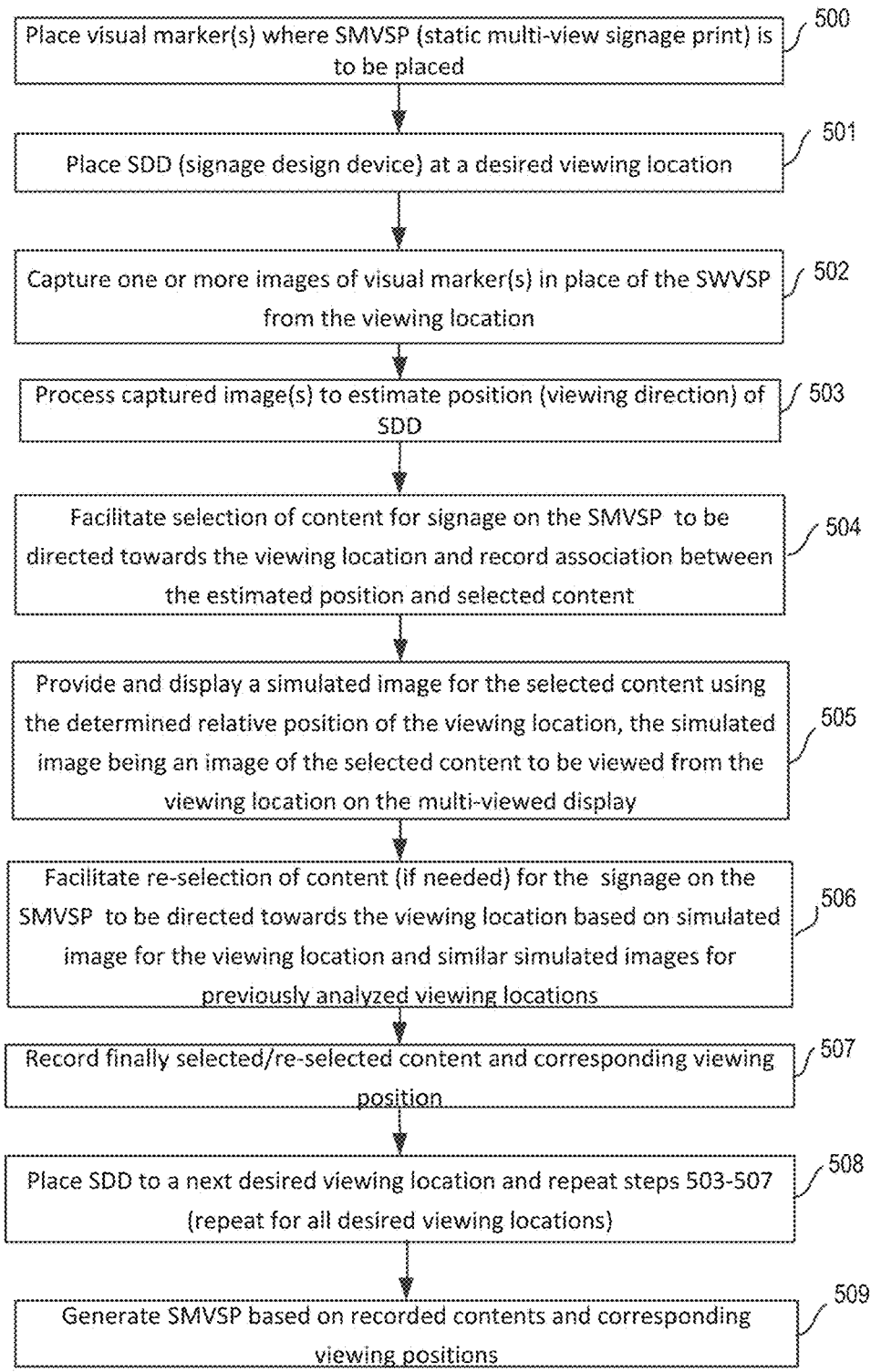
FIG. 5 is a flow chart depicting an exemplary process by which a system can assist in the design of content for a multi-view display, according to an embodiment of the invention.

FIG. 5 depicts an exemplary flowchart describing how the system of FIG. 4 can be used to design a static multi-view sign, according to an embodiment of the invention. It is noted that the exact sequence or order of steps shown in FIG. 5 is not required, so in principle, the various steps may be performed out of the illustrated order. Also certain steps may be skipped, different steps may be added or substituted, or selected steps or groups of steps may be performed in a separate application following the embodiments described herein.

As a non-limiting example scenario in FIG. 5, let us consider the case of a user designing a static multi-view sign on the wall of a grocery store that can be viewable from two different locations: the vegetable section and the dairy section. Then, in a method according to this exemplary embodiment, as shown in FIG. 5, in a first step 500, the visual marker(s) 400 may be placed by a user on the wall where the sign (signage print, SMVSP) is to be placed. In a next step 501, the signage design device 401 can be placed at a certain (desired) viewing location, for instance the vegetable section. In a next step 502, the camera 402 may capture one or more images of the visual marker(s) 400 from the viewing location. In a next step 503, the computer 403 may receive and process the captured image(s) to estimate the viewing location (e.g., a position including angle and/or distance) relative to the visual marker(s) 400. Exemplary processing options for the step 503 may include, but are not limited to, thresholding, pattern matching, image convolutions, and/or transformations. In a next step 504, the user may interact with the SDD 401 via its input device 404 to select the content to be seen from that viewing location and record the association between the estimated position and selected content, e.g., in a memory of the computer 403.

In a next step 505, the computer 403 may provide and display (on the display 405) a simulated image at least for the selected content using the determined relative position of the viewing location, where the simulated image is an image of the selected content to be viewed from the viewing location on the multi-view display. This simulated image may comprise the selected content, warped and/or otherwise transformed to be superimposed on the visual marker(s) 400. In addition to the simulated image for the current viewing location, to further assist the user to make a possible content re-selection, in step 505, the computer 403 may provide and display (on the display 405) one or more further simulated images previously generated and recorded by the SDD 401 for previously analyzed viewing locations/positions.

Then in step 506, based on the displayed simulated image(s) on the display 405, the SDD 401 may facilitate (if needed) re-selection of content by the user using the input device 404 (similar to the selection described for step 504) for the respective signage on the SMVSP to be directed towards that viewing location. In a next step 507, the SDD may save (record) an association between the estimated position and finalized content (selected or re-selected) for the current viewing location, e.g., saved in a memory of the computer 403. In a next step 508, the SDD 401 is configured to repeat steps 503-507 described herein for other desirable viewing locations. For example, the user may then move the device to another viewing location, for example the dairy section, and repeat the process. Thus, with the content and associated viewing locations/positions recorded, the user may move the device around the environment and visualize what the designed sign would look like from different viewing locations. Finally in step 509, a lenticular print pattern may be generated from the recorded content and corresponding viewing location information for multiple viewing locations.

Figure 6:
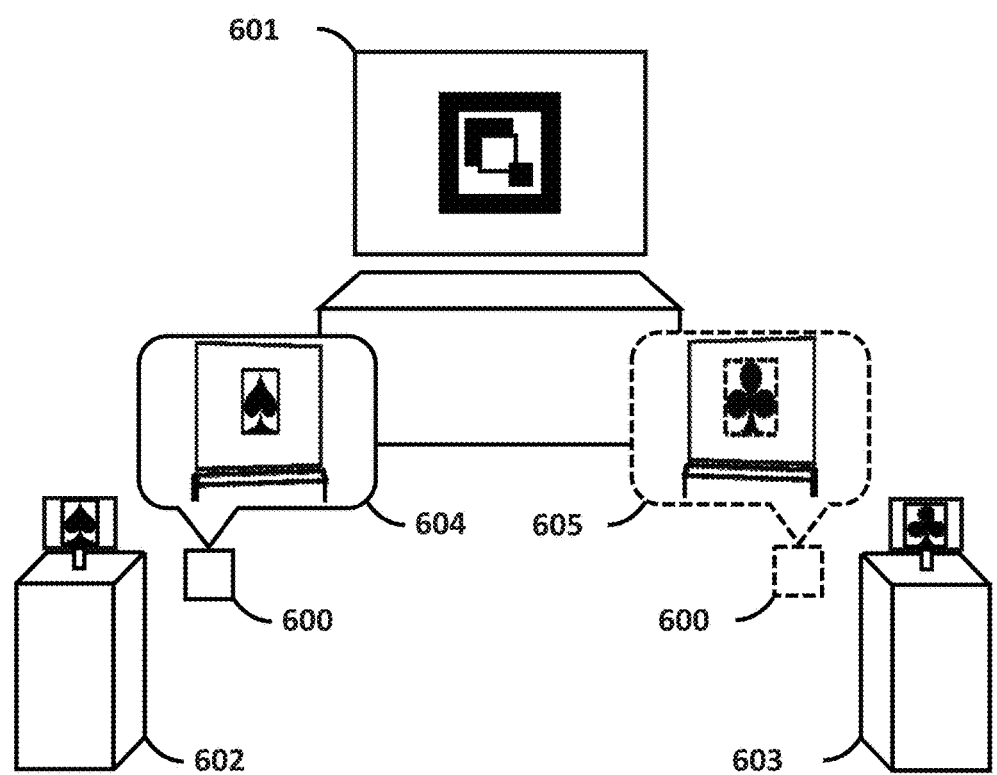
FIG. 6 shows an exemplary diagram demonstrating how the signage design device can be used to visualize the design content for a static multi-view sign, according to an embodiment of the invention.

FIG. 6 shows an example of how the signage design device (SDD) 600 can be used to visualize the design of a static multi-view sign. A visual marker 601 is placed on the wall where the sign is to be placed. The sign is designed to allow two views, one towards a first product display 602 and another towards a second product display 603. The user may place the signage design device by the first product display 602 and select a first content that is relevant to the first product display. The device, when placed near the first product display, now shows a camera feed of the environment with the first content superimposed on the visual marker, 604. The user may then bring the device by the second product display 603 and select a second content that is relevant to the second product display. The device, when placed near the second product display 603, then shows a camera feed of the environment with the second content superimposed on the visual marker, 605. Bringing the device from one product display to the other, the device shows the content associated with the nearby product display superimposed on the visual marker 601. The camera feed may be a video, providing a continuously updated visualization of what the designed static multi-view sign looks like from the location of the camera.

It is noted that according to various embodiments, any of the computer processing steps may be performed by the computer inside the device 401, or on a remote computer that communicates with the computer inside the device 401. For example, in one embodiment, the local computer in the device 401 may send captured images to a separate computer to perform image processing. In another embodiment, the selected content may be communicated to a remote server that records the content. In yet another embodiment, the content and viewing location information may be recorded on the local computer in the device 401 and then communicated to a remote computer to generate the print pattern. In another alternative embodiment, a computer may control the camera while communicating with a separate computer that may control the display.

Moreover, the aforementioned exemplary embodiment (e.g., see FIG. 4) utilizes a visual marker 400 and a camera 402 on the signage design device 401 to estimate the device's viewing location (position) relative to the sign/marker 400. An alternative embodiment may use one or more sensing systems to perform the viewing location estimation. Examples of suitable sensing systems may comprise cameras, range finders, structured light projectors, magnetometers, inertial measurement units, and/or other sensors. In an exemplary embodiment, a projector placed at the sign may project structured light that uniquely encodes each viewing angle of the sign. The signage design device may use a camera to detect and decode the structured light pattern to estimate the device's viewing angle. The structured light may encode each viewing angle using a variety of encodings, including, but not limited to, binary, gray-code, and the like.

The interface presented on the signage design device may allow more operations than just rendering the camera feed and selecting content. For example, the interface may allow the user to remove, replace, or otherwise edit previously selected content. It may also allow the user to increase, reduce, move, or otherwise alter the viewing locations and/or location boundaries associated with content. It may allow the user to mark zones where viewers should not see content at all, or set default content that viewers in all non-specified locations may see.

The interface (for controlling SDD operation by the user) may also allow the designer to specify and visualize boundary transition effects. Rather than a sharp change between two adjacent viewing locations, a smooth transition may be applied between the two contents so as to appear less jarring. Example techniques for transition include, but are not limited to, crossfading, fading to black, fading to white, and/or blurring. The interface may allow the designer to select established boundaries and choose the desired transition effect, if any. Upon selection of the effect, the SDD 401 may provide a pre-visualization of the transition that the designer may experience by moving the signage design device across the boundary.

It is noted that there are a variety of ways in which a designer may specify viewing locations using the device 401 and/or interface. For example, the boundaries of viewing locations may be marked at the location of the device 401. Alternatively, the designer may use the device 401 to mark the centers of viewing locations. In this case, a partitioning method may be used to automatically compute viewing location boundaries. For example, the boundaries may be estimated to be at the midpoint between adjacent viewing locations, or to establish fixed dimensions around the device's location.

It is noted that this description is not meant to be an exhaustive list of possible interfaces, processes, sensing systems, and/or implementations, and alternative embodiments do not fall outside of the spirit of the invention or restrict the scope of the subject matter.

The reader's attention is now drawn to electronic multi-view displays (EMVDs). A traditional display, such as LCD, LED, plasma, or projection displays, generally shows an image that is visible from all viewing locations simultaneously. Multi-view displays, on the other hand, show different respective images to different viewing locations simultaneously. A brief review of different EMVD principles of operation is provided below based on embodiments described at least in previously referenced U.S. non-provisional patent application Ser. No. 15/002,014 filed on Jan. 20, 2016, Ser. No. 15/015,099 filed on Feb. 3, 2016, and Ser. No. 15/060,527 filed on Mar. 3, 2016.

In one embodiment, a multi-view display may consist of one or more projection elements that may shine light of different colors and brightness at different angles. Each element, from a viewer's perspective, may appear to be a light source or pixel of the color and brightness projected onto that viewer. Thus, the appearance of each projection element from the perspective of any specific viewer may be dependent upon the angle from which the element is viewed. The projection element, as viewed from a particular angle, will appear to be a light source of the color and brightness of the light projected in that direction.

In one embodiment, each projection element may form a single pixel of a display, and a full graphic multi-view display may be formed from an array of projection elements. In another embodiment, a projection element may form a graphic via a mask, similar to the masks used to form arrow symbols on traffic lights. An embodiment of a multi-view display may include one or more projection elements that each may or may not have masks. In yet another embodiment, the mask may comprise a spatial light modulator, such as a LCD (liquid crystal display) or MEMS (micro-electronic mechanical system) shutter, to create dynamic graphics.

In the case of using an array of projection elements, each pico-projector pixel or each group of pico-projector pixels may be controlled by a processor. All of the processors in the display may be connected via a network, and a computing device, such as a computer or a laptop, may be used to drive the display.

In an alternative embodiment, a lens array may be placed in front of an imager, such as a LCD, LED, plasma display, or projector projecting onto a diffuser. In this embodiment, each lens in the array may form a projection element from the set of imager pixels beneath the lens. The number of imager pixels corresponding to each lens may determine the number of unique directions the display may project a differentiated image. With this technique, by varying the size and number of lenses in the array, a trade-off may be made between the pixel resolution of the multi-view image and the number of unique images and/or content simultaneously displayed. Lens arrays may include, but are not limited to, dot lenticulars, fly-eye lenticulars, and/or cylindrical lenticulars.

It is noted that this description is not an exhaustive list of possible implementations of electronic multi-view displays, and there exist many alternative embodiments that do not depart from the spirit or scope of the invention.

Now the reader's attention is directed to designing content for the electronic multi-view displays (EMVDs). The content of the EMVDs may be used to simultaneously show different content to viewers depending upon each person's location. While the aforementioned static multi-view signage prints (SMVSPs) may show different images at different angles, a multi-view display may show different dynamic content, and may also direct content to viewing locations that are not strictly determined by the viewing angle.

A signage design device (similar to the device shown in FIG. 4) may be used to aid in the design of content for the EMVD that directs different images at different angles. In the static multi-view signage example in FIG. 4, a visual marker placed in the sign location may be used to estimate the viewing location of the device 401. In the case of the EMVD, a visual graphic may be shown on the display 401. Similar to the static multi-view signage case, the camera and computer in the signage design device (SDD) 401 as shown in FIG. 4 may capture and process images of the visual graphic to estimate the device's viewing location. Therefore the SDD 401 like shown in FIG. 4 can be used for the EMVDs as well.

Unlike static multi-view signage, electronic multi-view display systems may also allow different content to be shown to different viewing locations that correspond to the same viewing angle. This is because the display may dynamically select the content to be shown at that viewing angle, depending on the presence of viewers in a location that occludes a location behind them. For example, a multi-view display may simultaneously show different content to viewers depending on each viewer's distance from the display. Such a display may be used in venues where it is desirable to show finer detailed graphics and/or text when a viewer is close to the display, and larger graphics for better visibility when a viewer is far from the display.

A designer may use a signage design device (SDD) to establish the viewing location in 3D space for the EMVD. For example, a multi-view display may show a visual graphic of a known size that the camera and computer of the SDD may capture and process to estimate the viewing location (e.g., a position including an angle and/or a distance). In addition to the angle, the distance of the device to the display may be estimated as well. The viewing angle may be estimated using the perspective distortion of the graphic, while the viewing distance may be estimated using the scale of the graphic. Alternatively, similar to the static multi-view signage case, a sensing system may be used to estimate the location of the signage design device. The designer may place the device at various positions in the 3D environment in front of the electronic multi-view display and register those positions through an interface on the device to designate the viewing locations.

An alternative way to register the location of a signage design device relative to the EMVD is to encode the location information using the display's projection elements. Each projection element in the EMVD display may show a sequence of patterns that uniquely encode each viewing angle of the projection element. The encodings may be in a variety of formats, including, but not limited to, binary and/or gray-code. The SDD may capture and decode the pattern of a projection element as observed from its viewing location, providing an estimate of its viewing angle with respect to the projection element. By decoding the pattern from two or more projection elements in the EMVD, the location of the signage design device relative to the display may be estimated. The patterns for each projection element may be shown and captured sequentially or at the same time. An exemplary embodiment that captures the patterns sequentially may comprise a photo-detector that can detect light emitted from the display. Since the photo-detector may only detect the presence of light, and not which projection element the light comes from, each projection element may need to show its pattern sequentially in a known order. An exemplary embodiment where the patterns are captured in parallel may comprise a camera that observes the entire display, capturing images of all projection elements at once.

Figure 7:
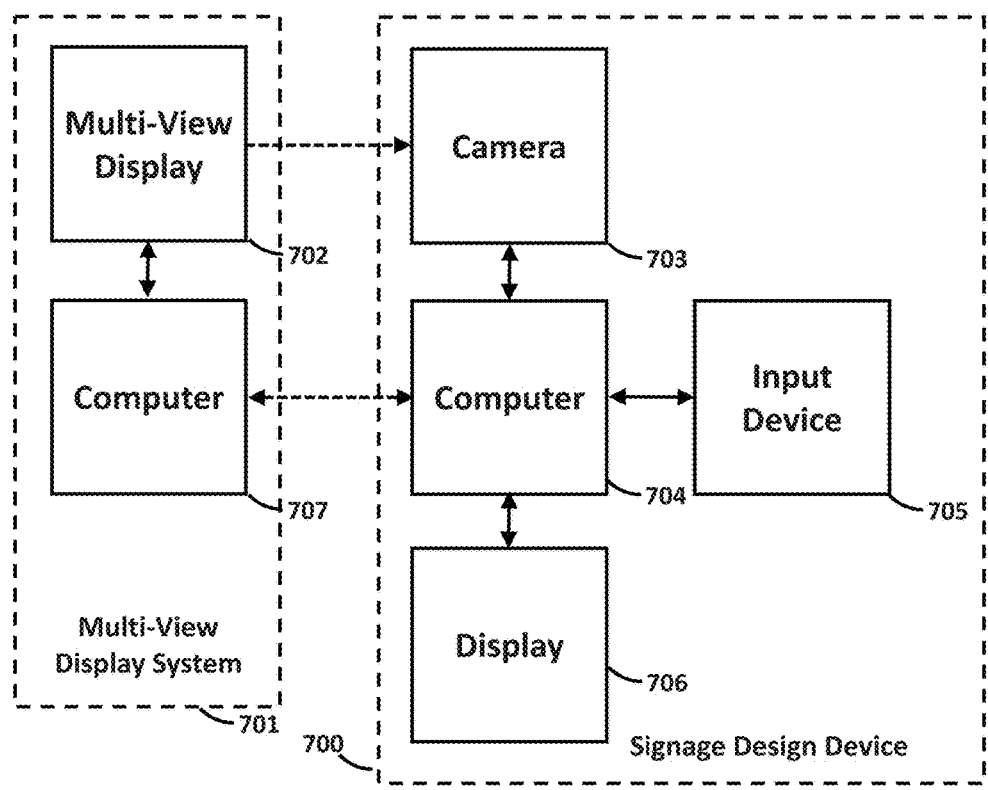
FIG. 7 is a block diagram depicting an exemplary interaction between an EMVD system and a signage design device, according to an embodiment of the invention.

FIG. 7 depicts an exemplary block diagram of a signage design device 700 interacting with an EMVD system 701, according to one embodiment of the invention. The display 702 in the EMVD system 701 may show a visual graphic, of which the camera 703 in the signage design device may capture images. The computer 704 in the signage design device may process the images to estimate the location of the device relative to the multi-view display. The computer 704 communicates with the input device 705 and display 706 on the signage design device 700 to present an interface to the designer, allowing the designer to identify/determine viewing locations and/or select content. The signage design device computer 704 may communicate the viewing location and content information to the multi-view display system computer 907 in the EMVD system 701.

Figure 8:
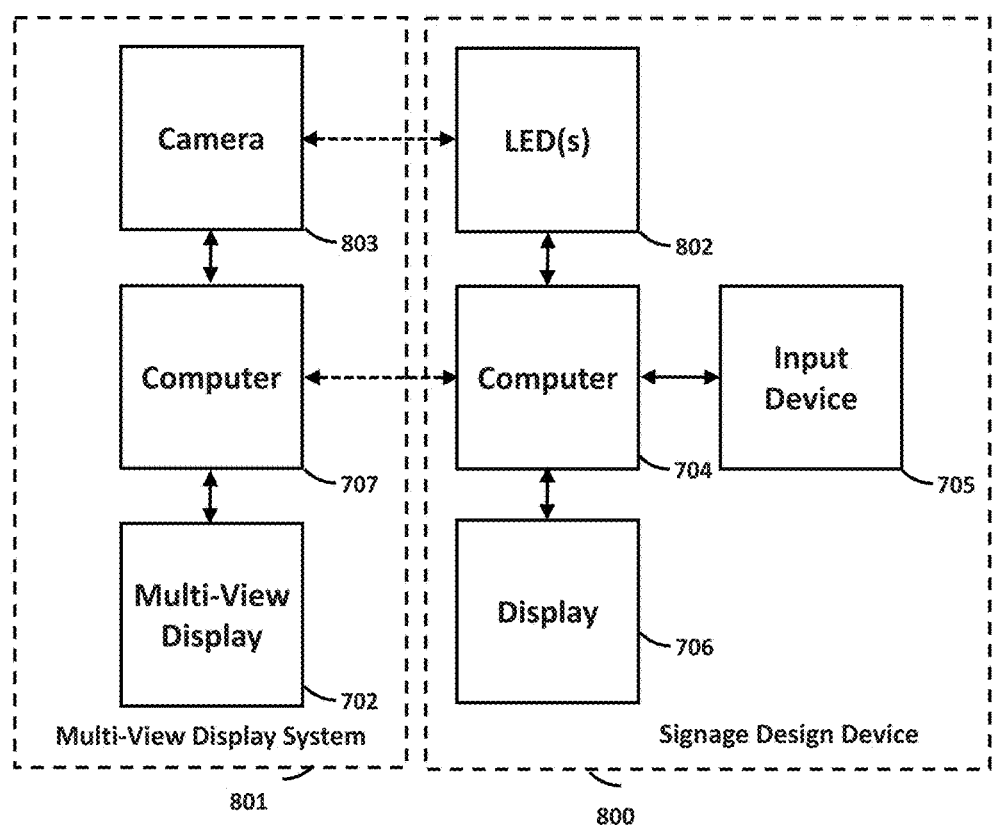
FIG. 8 is a block diagram depicting an alternative exemplary interaction between an EMVD system and a signage design device, according to an embodiment of the invention.

FIG. 8 depicts an alternative exemplary block diagram of an alternative embodiment of a signage design device 800 interacting with an alternative embodiment of a multi-view display system 801. Similar elements/devices in FIG. 8 are designated by the same reference numbers as the similar elements in FIG. 7 The signage design device may actuate an LED 802, while a camera 803 (or using one or more cameras for capturing a position in 3D) and a computer 707 of the multi-view display system captures and processes images of the environment. From the images, the location of the signage design device 800 may be estimated by locating the actuated LED using image processing techniques which may include, but is not limited to, gray-scale conversion, thresholding, erosion, dilation, and/or blob detection. The LED may be constantly turned on, or may be flashed synchronously with the camera capturing images to improve the signal-to-noise ratio. In addition, the LED 802 and camera 803 may operate in the visible spectrum, IR spectrum, and/or at other wavelengths.

It is further noted that according to alternative embodiments, other position determining systems, for determining a position of the SDD in a viewing location relative to the MVD, that are well known and within the scope of the invention, may be used. Some examples may include, without limitation, time-of-flight cameras, structured light scanners, laser scanners, global positioning systems, indoor positioning systems, altimeters, and/or the like.

Figure 9:
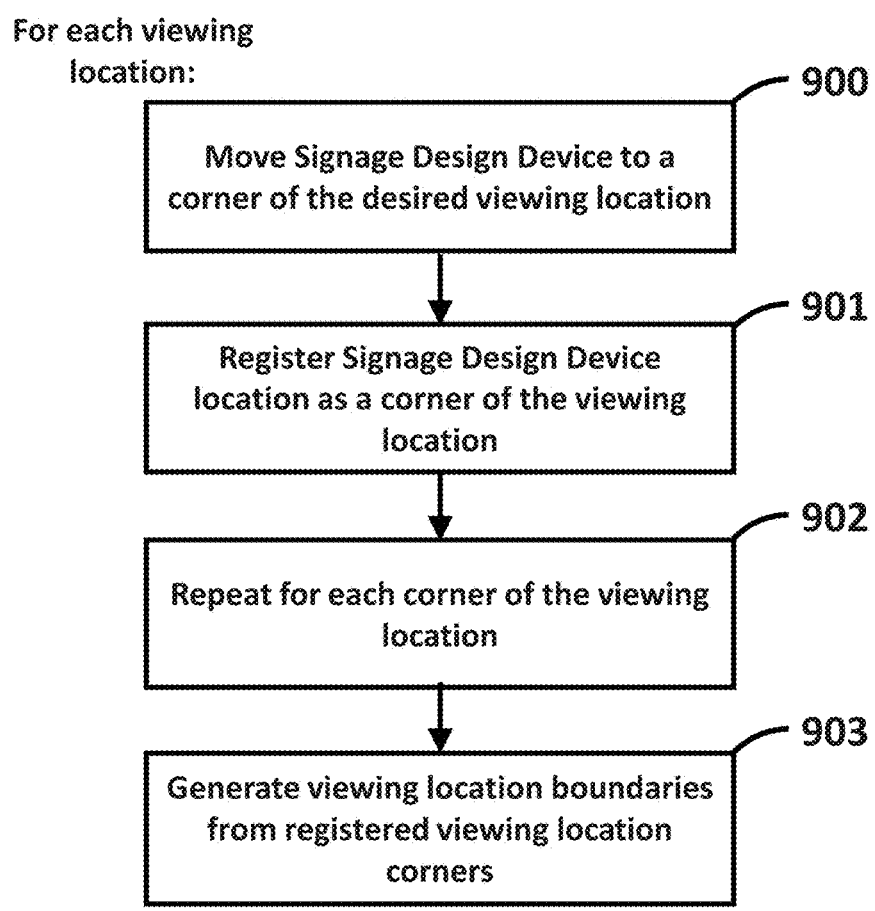
FIG. 9 is a diagram depicting an exemplary process by which a designer may designate viewing locations using a signage design device, according to an embodiment of the invention.
Figure 10:
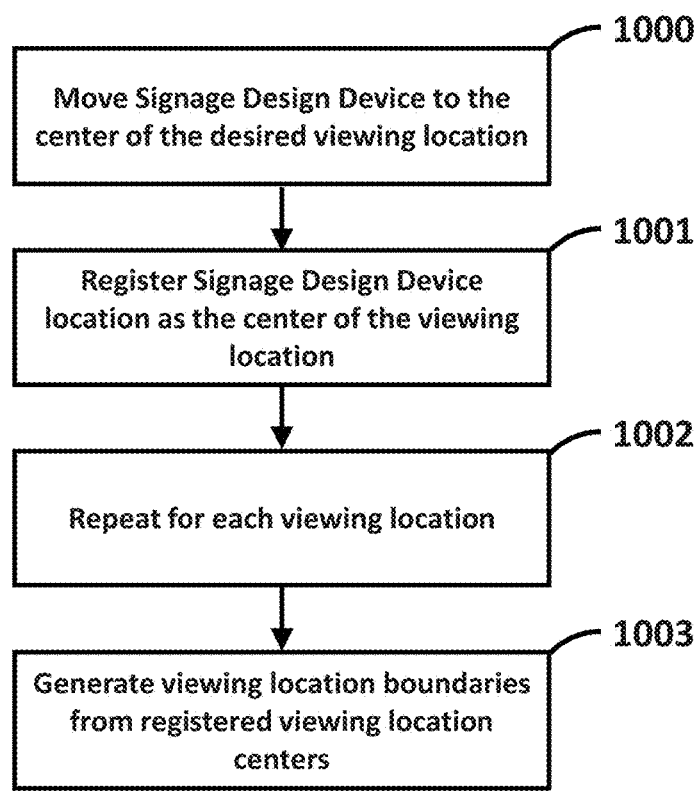
FIG. 10 is a diagram depicting an alternative exemplary process by which a designer may designate viewing locations using a signage design device, according to an embodiment of the invention.

Furthermore, there are a variety of ways in which a designer may use the device to designate viewing locations. For example, a viewing location in 3D space may be geometrically represented as a polyhedron. Specifying the vertices or corners of the polyhedron may be sufficient to establish the viewing location or other techniques as demonstrated in flow charts shown in FIGS. 9 and 10, according to further embodiments of the invention. It is noted that the exact sequence or order of steps shown in FIGS. 9 and 10 is not required, so in principle, the various steps may be performed out of the illustrated order. Also certain steps may be skipped, different steps may be added or substituted, or selected steps or groups of steps may be performed in a separate application following the embodiments described herein.

FIG. 9 depicts an exemplary process by which a designer may designate the corners of the viewing location/area such as polyhedron using a signage design device. The designer may, in step 900, move the device to a corner of the desired viewing location, and then the SDD device, in step 901, can register the device location. A variety of exemplary methods to register the location of the device have been described herein. Steps 900 and 901 may be repeated in step 902 for each corner of the desired viewing location. From the registered viewing location corners, in step 903, the boundaries of the viewing location may be generated. Techniques for determining the edges, faces, and/or surfaces of a solid from a set of vertices are familiar to those with ordinary skill in the art. Exemplary techniques may include, but are not limited to, triangle mesh modeling and/or polygon mesh modeling. This process may be performed for each desired viewing location.

An alternative way to designate/determine viewing locations may be to specify the centers of viewing locations, and generate the location boundaries using partitioning algorithms. FIG. 10 depicts such a process. In step 1000, the designer may move the SDD to the center of the desired viewing location, and then the SDD device, in step 1001, can register the device location. Steps 1000 and 1001 may be repeated for each viewing location. From the registered viewing location centers, in step 1003, the boundaries of the viewing location may be generated.

A variety of techniques for determining viewing location boundaries may be employed. Such techniques may include, but are not limited to, establishing boundaries midway between viewing locations, establishing boundaries to achieve viewing locations of fixed dimensions, and/or establishing each viewing location as a sphere or other specified geometry.

Upon establishing viewing locations (i.e., their positions including angle and distance) and/or content using a signage design device, the content may be displayed immediately on the electronic multi-view display towards the appropriate viewing locations. Alternatively, a pre-visualization interface, similar to the static multi-view signage case, may be used to aid the design of content without disturbing the content currently being displayed. For example, if a designer wished to design content for a multi-view retail display in a mall during open hours, he or she may not want to disturb what shoppers currently see. With a pre-visualization interface, the designer may design and visualize the content on the signage design device while avoiding changing the content that is currently being shown on the multi-view display to other viewers.

In the static multi-view signage case, the signage design device may overlay the appropriate content onto the visual marker to provide a pre-visualization of the signage content on the signage design device display. In order for an electronic multi-view display pre-visualization interface to not disturb the currently displayed content, a visual graphic may be presented only to the location of the signage display device, allowing the device to locate and overlay the content appropriately on the device display. In an alternative exemplary embodiment, fixed visual markers may be placed on the electronic multi-view display outside of the display area that the signage design device may capture images of and locate within the camera view, allowing overlay of content.

Figure 11:
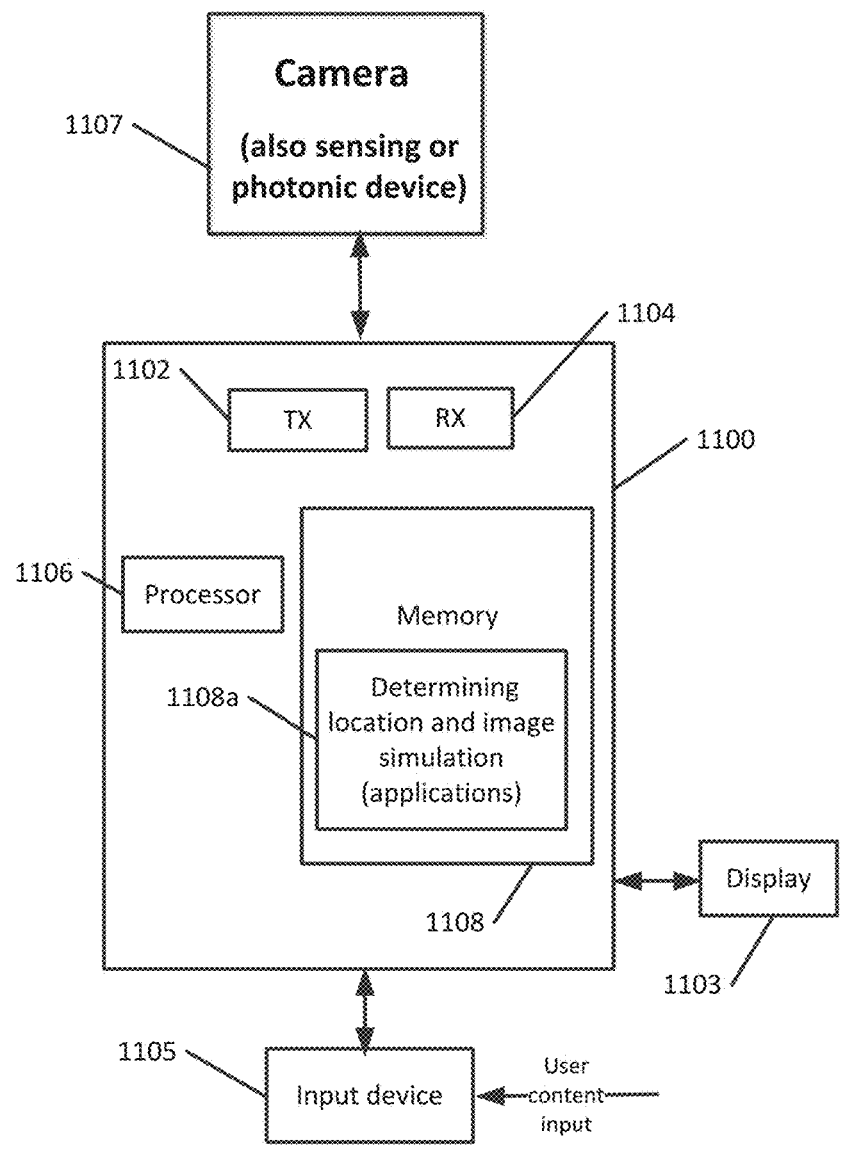
FIG. 11 is a detailed block diagram of a signage design device for implementing various embodiments of the invention described herein.

FIG. 11 shows an example of a block diagram of a signage design device 1100 (also shown as the SDD 401, 700 and 800 in FIGS. 4, 7 and 8 respectively) in more detail which can be used for implementing various embodiments of the invention described herein. FIG. 11 is a simplified block diagram of the device 1100 that is suitable for practicing the exemplary embodiments of this invention, e.g., in reference to FIGS. 4-10, and a specific manner in which components of the SDD 1100 are configured, to cause that SDD to operate.

The device 1100 may comprise a computer (or generally a computing device) 1101, which may comprise, e.g., at least one transmitter 1102, at least one receiver 1104 (both can be wireless), at least one processor (controller) 1106, and at least one memory 1108 including a determining location and image simulation module 1108a. The transmitter 1102 and the receiver 1104 may be configured to transmit and receive signals to and from outside computers/servers for assisting in performing some functions such as processing captured images (e.g., step 503 in FIG. 5), generating simulated images (e.g., step 505 in FIG. 5) and performing other appropriate functionalities. The transmitter 1102 and the receiver 1104 may be generally means for transmitting/receiving and may be implemented as a transceiver, or a structural equivalent thereof.

Various embodiments of the at least one memory 1108 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the processor 1106 include but are not limited to: general purpose computers, special purpose computers, microprocessors, digital signal processors (DSPs), multi-core processors, embedded, and System on Chip (SoC) devices.

The determining location and image simulation application module 1108a can comprise a plurality of applications stored in the memory 1108 and may provide implementation of or instruction for implementing various steps, for example, steps 502-507 shown in FIG. 4, steps 901-903 and 1001-1003 in FIGS. 9 and 10 respectively. Implementation of some of these steps may require (as described herein) interaction with other components of the SDD, such as an input device 1105, a display 1103 and a device such as a camera, a sensing device or a photonic device 1107 as disclosed herein. Devices 1105, 1103 or 1107 may or may not be a part of the computer 1101.

The module 1108a may be implemented using computer program(s) stored in the memory 1108, but in general it may be implemented as software, firmware and/or a hardware module, or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

An example of a variation that would fall in the scope and spirit of the invention would be using the invention to design an experience using generic, placeholder content, with the intent of replacing that content with other content at a later time.

It is noted that various non-limiting embodiments, described and claimed herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. A method for designing content for a multi-view display, wherein a signage design device is placed at plural viewing locations, one viewing location at a time, and wherein the multi-view display is not yet installed at an intended installation site, the method comprising:
   determining, using the signage design device, respective positions of the signage design device, at least some of the plural viewing locations, relative to the intended installation site of the multi-view display;
   receiving, through an input device of the signage design device, a respective content selection for each of said some viewing locations, the respective content selection being intended for display via the multi-view display, once installed, for viewing from respective ones of said some viewing locations; and
   displaying, using the signage design device, respective simulated images of the respective content selections using the respective determined positions of said some viewing locations.

2. The method of claim 1, and further comprising:
   establishing one or more viewing zones for the multi-view display using the respective determined positions of the signage design device at said some viewing locations, wherein the content selection is the same for all viewing locations that are viewable within any one particular viewing zone.

3. The method of claim 1, wherein the simulated image is generated by the signage design device.

4. The method of claim 1, wherein the viewing locations fall into one or more viewing zones of the multi-view display, the method further comprising:
   altering a boundary of the one or more viewing zones.

5. The method of claim 1, wherein the viewing locations fall into one or more viewing zones of the multi-view display, the method further comprising:
   specifying a transition effect to be applied proximal to a boundary between viewing zones.

6. The method of claim 5 wherein the signage design device is moved across the boundary between viewing zones, the method further comprising:
   displaying, via the signage design device, the transition effect.

7. The method of claim 1, wherein determining the respective positions of the signage design device comprises capturing, by a camera of the signage design device, one or more images depicting the intended installation site of the multi-view display from said some viewing locations.

8. The method of claim 1, wherein determining the respective positions of the signage design device comprises capturing, by a camera, one or more images depicting an environment encompassing the signage design device.

9. The method of claim 1, wherein the multi-view display comprises a static multi-view signage print.

10. The method of claim 9, wherein the static multi-view signage print has a lenticular print pattern.

11. The method of claim 1, wherein determining the respective positions of the signage design device comprises capturing, by a camera of the signage design device, one or more images depicting a visual marker in the intended installation site of the multi-view display from said some viewing locations.

12. The method of claim 1, wherein determining the respective positions of the signage design device comprises processing, at the signage design device, information obtained by the signage design device pertaining to the position thereof with respect to the intended installation site of the multi-view display.

13. The method of claim 1, wherein displaying the respective simulated images further comprises displaying the respective simulate images on a display of the signage design device.

14. A signage design device for designing content for a multi-view display, the signage design device comprising:
   a position-determining device, wherein the position-determining device facilitates determining a position of the signage design device placed at a viewing location, the position being determined relative to location or intended installation site of the multi-view display;
   an input device, wherein the input device is configured to receive a content selection for the multi-view display to be viewed from the viewing location; and
   a computer, wherein the computer establishes a viewing zone for the multi-view display based on the determined position of the position-determining device, wherein the viewing zone encompasses the viewing location.

15. The signage design device of claim 14, wherein the computer generates a simulated image of the content selection as viewed from the viewing zone.

16. The signage design device of claim 14, further comprising a display, wherein the display presents the simulated image of the content.

17. The signage design device of claim 14, wherein the position determining device is a camera that captures (a) one or more images of a visual marker at a location or intended installation site of the multi-view display or (b) captures a visual graphic shown on the multi-view display.

18. The signage design device of claim 14, wherein the multi-view display comprises a static multi-view signage print.

19. The signage design device of claim 14, where the computer comprises a transceiver that communicates with a computer that is distinct from the signage design device to facilitate determining the position of the signage design device.

20. A method for designing content for a multi-view display, wherein a signage design device is placed at a plurality of viewing locations, one viewing location at a time, the method comprising:
   establishing viewing zones for the multi-view display using the signage design device, each viewing zone being defined by one or more of the plurality of viewing locations, and
   generating a simulated image of a respective content selection for each respective viewing zone, wherein the respective content selection is viewable at each viewing location within the respective viewing zone.

21. The method of claim 20, wherein at least one of the viewing zones is defined by multiple viewing locations of the plurality thereof.

22. The method of claim 20 and further comprising displaying the simulated image on a display of the signage design device.

23. A method for designing content for a multi-view display, wherein a signage design device is placed at a viewing location, and wherein the multi-view display is not yet installed at an intended installation site, the method comprising:
- determining, using the signage design device, a position of the signage design device relative to the intended installation site of the multi-view display;
- receiving, through an input device of the signage design device, a content selection intended for display via the multi-view display, once installed, for viewing from the viewing location; and
- displaying, using the signage design device, a simulated image of the content selection for the viewing location on a display of the signage design device.

* * * * *